US006412945B1

(12) United States Patent
Grove et al.

(10) Patent No.: US 6,412,945 B1
(45) Date of Patent: Jul. 2, 2002

(54) NON-UNIFORM MASK LENS

(75) Inventors: Corey M. Grove, Red Lion, PA (US); Stephen E. Chase, Jarettsville; Jeffrey S. Hofmann, Abingdon, both of MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/696,332

(22) Filed: Oct. 25, 2000

Related U.S. Application Data
(60) Provisional application No. 60/161,409, filed on Oct. 25, 1999.

(51) Int. Cl.⁷ ................................................ G02C 7/02
(52) U.S. Cl. ...................................... 351/159; 351/177
(58) Field of Search ............................... 351/159, 177, 351/41; 2/6.3, 6, 7, 15, 410, 424, 426–427

(56) References Cited

U.S. PATENT DOCUMENTS 5,204,700 A    4/1993  Sansalone .................... 351/43
5,604,547 A  * 2/1997  Davis et al. .................. 351/44
5,862,530 A    1/1999  Shillington ................... 2/439
6,000,798 A  * 12/1999 Chipman et al. ............ 351/176
6,176,239 B1 * 1/2001  Grove et al. ........... 128/206.24

OTHER PUBLICATIONS

Jacobs, S.D., et al "MRF: Computer–Controlled Optics Manufacturing", American Ceramic Society Bulletin (Dec. 1999), vol. 78, No. 12.

* cited by examiner

Primary Examiner—Jordan M. Schwartz
(74) Attorney, Agent, or Firm—Ulysses John Biffoni

(57) ABSTRACT

A device and method for a non-uniform lens which incorporates geometry for external and internal eye relief which meets requirements of optical corrections and optical sighting systems is provided. The geometry of the front and back surfaces of a lens are approximated by curve-fitting polynomials so that the optical correction is included. The non-uniform mask lens can be made of any optical material and can be cast or injection molded.

11 Claims, 1 Drawing Sheet

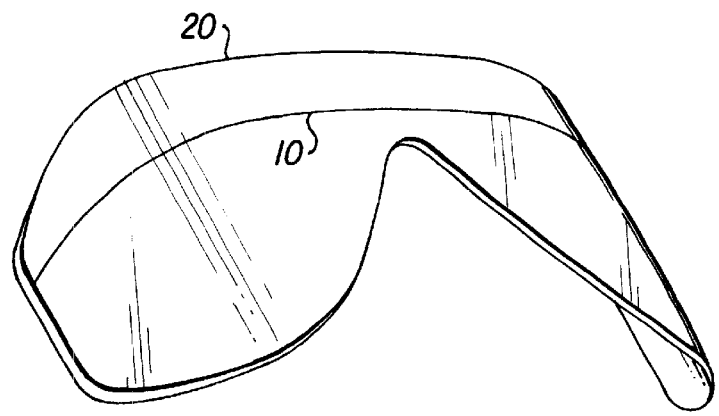
FIG. 1
FIG. 2
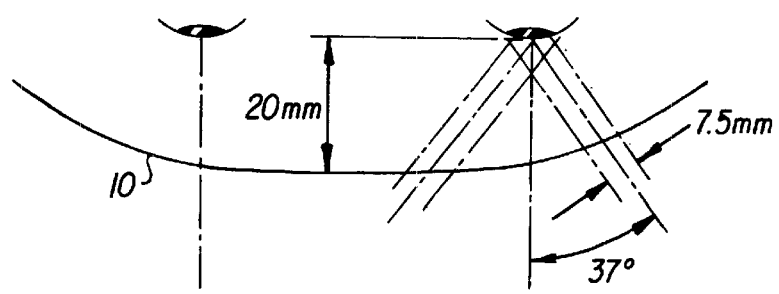
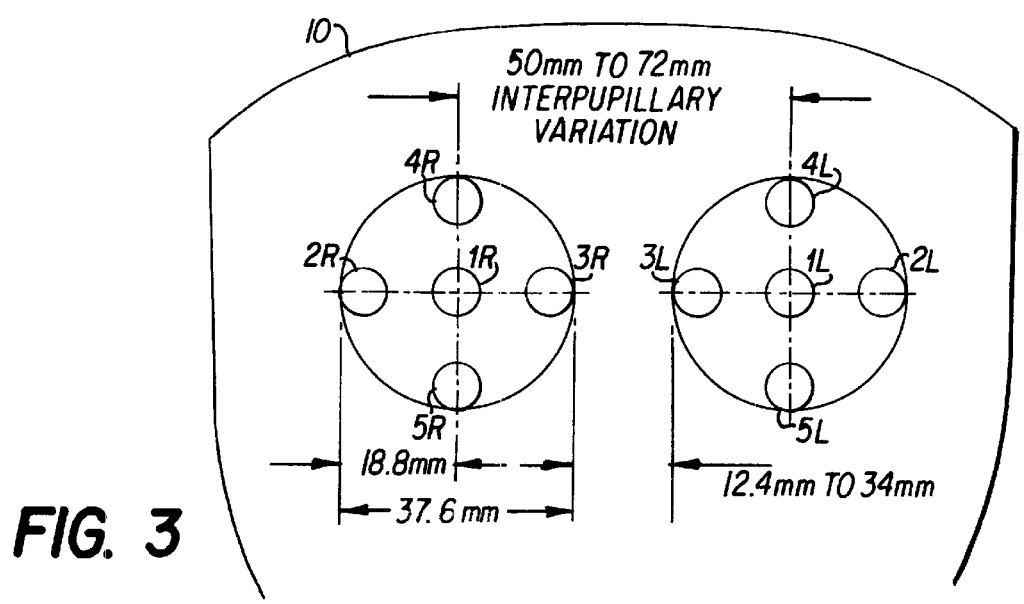
FIG. 3

NON-UNIFORM MASK LENS

REFERENCE TO RELATED APPLICATION

This application claims benefit of provisional application Ser. No. 60/161,409 filed Oct. 25, 1999 which is herein incorporated by reference as if specifically set forth herein.

GOVERNMENT INTEREST

The invention described herein may be manufactured, licensed, and used by or for the U.S. Government.

FIELD OF THE INVENTION

The present invention relates to mask lenses for night vision and optical sighting. More particularly, the present invention relates to a device and method for a non-uniform lens which incorporates geometry for external and internal eye relief compatible with optical sighting and optical correction systems.

BACKGROUND OF THE INVENTION

This invention relates to a method and device for a single non-uniform mask lens which incorporates eye relief geometry for night vision and optical sighting systems as well as for optical correction systems.

In existing military masks, such as the M40 and MCU-2/P, eye relief of the mask lens is well outside the 25-mm eye relief needed for night vision goggles and a variety of sighting systems. In military masks such as the M48/M49, the mask lenses are close enough to the eye to provide eye relief but do not adequately accommodate optical correction. The existing M45 mask provides adequate internal and external eye relief but requires a two-lens system.

Available optical geometry dictates the use of common geometrical shapes in the development of lens systems. These common geometrical shapes do not allow for optimal internal and external eye relief needed for compatibility of optical correction with optical sighting systems. A similar lens profile to that of the present invention could be developed by combining common optical geometrical shapes. However, available optical polishing techniques do not allow for a smooth optical transition between lens geometries.

SUMMARY OF THE INVENTION

The present invention provides a device and method which incorporate an optimal interface between the internal optical correction and external sighting systems in a single non-uniform mask lens. The non-uniform mask lens can be made of any optical material and can be cast or injection molded to incorporate the desired geometry.

An embodiment of the present invention employs the polynomial curve used to describe the Phase III RESPO 21 lens, a lens design that has been established as the leading lens design approach for certain military applications, see Edgewood Research, Development, and Engineering Center Technical Report 368 (ERDC-TR-368), incorporated herein by reference in its entirety and U. S. patent. application Ser. No. 9/049,659, "Advanced Chemical Biological Mask," also incorporated herein by reference in its entirety. In this design approach, a polynomial curve captures the geometry of the specific mask lens design illustrated in FIG. 1. Table 1 contains the coordinates for the contour 10 of this particular lens generated using the polynomial curve established for this lens design. Using this polynomial curve, points generated to define the outside profile 20 of the overall geometry of this lens are contained in Table 2. A first best-fit polynomial curve for the front surface is generated from these coordinates and is then combined with optical calculations to generate a second polynomial curve for the back surface. The combination of these two curves adds the optical geometry required for eye relief to the original mask lens, see C. M. Grove, et al, Edgewood Chemical Biological Center Technical Report 063 (ECBC-TR-063), "Lens Concept For The Joint Service General Purpose Mask," October 1999, incorporated herein by reference in its entirety.

TABLE 1

| Point | X Coordinate | Y Coordinate | Z Coordinate |
|---|---|---|---|
| 1 | −2.8485 | −1.400 | 0 |
| 2 | −2.6445 | −0.925 | 0 |
| 3 | −2.3856 | −0.4786 | 0 |
| 4 | −2.0208 | −0.127 | 0 |
| 5 | −1.539 | 0.0799 | 0 |
| 6 | −1.0321 | 0.1792 | 0 |
| 7 | −0.5169 | 0.2175 | 0 |
| 8 | 0.0 | 0.2248 | 0 |
| 9 | 0.5169 | 0.2175 | 0 |
| 10 | 1.0321 | 0.1792 | 0 |
| 11 | 1.539 | 0.0779 | 0 |
| 12 | 2.0108 | −0.127 | 0 |
| 13 | 2.3856 | −0.4786 | 0 |
| 14 | 2.6445 | −0.925 | 0 |
| 15 | 2.8485 | −1.400 | 0 |

TABLE 2

| Point | X Coordinate | Z Coordinate | Y Coordinate |
|---|---|---|---|
| 1 | 0.0 | 0.0 | 0.0 |
| 2 | 1.835 | 0.0 | 0.0 |
| 3 | 2.835 | 1.0 | 0.0 |
| 4 | 2.835 | 2.1845 | 0.0 |
| 5 | 2.3332 | 3.0517 | 0.0 |
| 6 | 2.0075 | 3.0445 | 0.0 |
| 7 | 1.7032 | 2.9271 | 0.0 |
| 8 | 1.4339 | 2.7426 | 0.0 |
| 9 | 1.2113 | 2.5035 | 0.0 |
| 10 | 1.0034 | 2.2508 | 0.0 |
| 11 | 0.8057 | 1.9902 | 0.0 |
| 12 | 0.6186 | 1.7218 | 0.0 |
| 13 | 0.4364 | 1.450 | 0.0 |
| 14 | 0.253 | 1.179 | 0.0 |
| 15 | 0.0 | 0.987 | 0.0 |
| 16 | −0.253 | 1.179 | 0.0 |
| 17 | −0.4364 | 1.450 | 0.0 |
| 18 | −0.6186 | 1.7218 | 0.0 |
| 19 | −0.8057 | 1.9902 | 0.0 |
| 20 | −1.0034 | 2.2508 | 0.0 |
| 21 | −1.2113 | 2.5035 | 0.0 |
| 22 | −1.4339 | 2.7426 | 0.0 |
| 23 | −1.7032 | 2.9271 | 0.0 |
| 24 | −2.0075 | 3.0445 | 0.0 |
| 25 | −2.3332 | 3.0517 | 0.0 |
| 26 | −2.835 | 2.1845 | 0.0 |
| 27 | −2.835 | 1.0 | 0.0 |
| 28 | −1.835 | 0.0 | 0.0 |
| 29 | 0.0 | 0.0 | 0.0 |

The resultant family of curves is $$\text{Sag}(x) = ax^2 + bx^4 + cx^6 + dx^8 + ex^{10} + fx^{12}$$

where the coefficients (a, ..., f) of the various powers of x are contained in Table 3. The resultant curves for the front and back surfaces of the lens fully define the geometry needed for the variable thickness lens that is optically corrected to accommodate changes in curvature. That is, both curves fully define the geometry needed for the variable thickness lens with this contour geometry. Using this equation and the coefficients contained in Table 3, the thickness corresponding to specific points on the lens can be calculated, as contained in Table 4.

TABLE 3

| Coefficient | Front Surface | Back Surface |
|---|---|---|
| A | 3.65E-02 | 0.0386 |
| B | 7.9316E-3 | 0.007 |
| C | -8.54E-05 | 0.000 |
| D | 3.25E-04 | 3.898E-4 |
| E | -1.66E-05 | -2.35E-05 |
| F | -1.50E-07 | 0.000 |

TABLE 4

| Point | X Coordinate | Front Sag | Rear Sag | Est. Thickness |
|---|---|---|---|---|
| 0 | 0 | 0 | 0.06 | |
| 1 | 0.05 | 9.1252E-05 | 0.06009654 | 0.06000519 |
| 2 | 0.1 | 0.0003656 | 0.0603867 | 0.06002014 |
| 3 | 0.15 | 0.00082484 | 0.06087204 | 0.06004453 |
| 4 | 0.2 | 0.00147193 | 0.0615552 | 0.06007796 |
| 5 | 0.25 | 0.00231104 | 0.06243985 | 0.06011988 |
| 6 | 0.3 | 0.0033475 | 0.06353073 | 0.06016961 |
| 7 | 0.35 | 0.00458787 | 0.06483363 | 0.06022628 |
| 8 | 0.4 | 0.00603989 | 0.06635545 | 0.06028891 |
| 9 | 0.45 | 0.0077125 | 0.06810419 | 0.06035638 |
| 10 | 0.5 | 0.00961592 | 0.070089 | 0.06042742 |
| 11 | 0.55 | 0.01176164 | 0.07232025 | 0.06050068 |
| 12 | 0.6 | 0.01416251 | 0.07480961 | 0.06057471 |
| 13 | 0.65 | 0.01683281 | 0.07757015 | 0.06064797 |
| 14 | 0.7 | 0.01978836 | 0.08061651 | 0.06071889 |
| 15 | 0.75 | 0.02304667 | 0.08396504 | 0.06078586 |
| 16 | 0.8 | 0.026627 | 0.08763408 | 0.06084729 |
| 17 | 0.85 | 0.03055112 | 0.09164414 | 0.06090163 |
| 18 | 0.9 | 0.03484249 | 0.09601831 | 0.06094742 |
| 19 | 0.95 | 0.03952763 | 0.10078258 | 0.96098329 |
| 20 | 1.0 | 0.04463599 | 0.10596631 | 0.06100805 |
| 21 | 1.05 | 0.0502004 | 0.11160269 | 0.06102071 |
| 22 | 1.1 | 0.0562576 | 0.11772934 | 0.0610205 |
| 23 | 1.15 | 0.06284875 | 0.124388892 | 0.06100692 |
| 24 | 1.2 | 0.07002004 | 0.13162982 | 0.06097973 |
| 25 | 1.25 | 0.07782333 | 0.13950697 | 0.06093901 |
| 26 | 1.3 | 0.08631689 | 0.14808259 | 0.0608851 |
| 27 | 1.35 | 0.09556618 | 0.15742717 | 0.06081858 |
| 28 | 1.4 | 0.10564466 | 0.16762037 | 0.06074024 |
| 29 | 1.45 | 0.11663472 | 0.178752 | 0.06065097 |
| 30 | 1.5 | 0.12862861 | 0.1909231 | 0.06055163 |
| 32 | 1.6 | 0.15605195 | 0.21885023 | 0.06032528 |
| 33 | 1.65 | 0.17172403 | 0.23487395 | 0.0601985 |
| 34 | 1.7 | 0.18888722 | 0.25247463 | 0.06006171 |
| 35 | 1.75 | 0.20769794 | 0.27182521 | 0.05991317 |
| 36 | 1.8 | 0.2283284 | 0.29311598 | 0.05975011 |
| 37 | 1.85 | 0.25096749 | 0.3165554 | 0.05956878 |
| 38 | 1.9 | 0.27582151 | 0.34237075 | 0.05936455 |
| 39 | 1.95 | 0.30377484 | 0.3708086 | 0.05913225 |
| 40 | 2.0 | 0.33309042 | 0.40213504 | 0.0588666 |
| 41 | 2.05 | 0.36600996 | 0.43663566 | 0.05856284 |
| 42 | 2.1 | 0.40215397 | 0.47461517 | 0.05821743 |
| 43 | 2.15 | 0.44182141 | 0.5163966 | 0.05782872 |
| 44 | 2.2 | 0.48532899 | 0.5623201 | 0.05739738 |
| 45 | 2.25 | 0.53300998 | 0.61274112 | 0.05692665 |
| 46 | 2.3 | 0.58521261 | 0.66802805 | 0.05642221 |
| 47 | 2.35 | 0.64229769 | 0.72855906 | 0.05589173 |
| 48 | 2.4 | 0.70463577 | 0.79471823 | 0.05534415 |
| 49 | 2.45 | 0.77260325 | 0.86689074 | 0.05478887 |
| 50 | 2.5 | 0.84657787 | 0.945457 | 0.05423493 |
| 51 | 2.55 | 0.92693294 | 1.0307857 | 0.05369032 |
| 52 | 2.6 | 1.01403062 | 1.123222559 | 0.05316145 |
| 53 | 2.65 | 1.10821384 | 1.22309582 | 0.05265294 |
| 54 | 2.7 | 1.20979678 | 1.33067476 | 0.05216746 |
| 55 | 2.75 | 1.31905386 | 1.44618713 | 0.05170583 |
| 56 | 2.8 | 1.43620687 | 1.56978918 | 0.05126718 |

Alternatively, an embodiment of a non-uniform lens according to the present invention having both a front surface curvature and a back surface curvature can be approximated using a double conic geometry. However, this double conic geometry requires optical blending in the middle of the lens. Required blending can be minimized by forcing tangency and curvature at the mating surfaces in this embodiment.

The non-uniform lens can be made of any optical material. A flat variable thickness mold can be employed, or, alternatively, the lens can be fabricated using injection molding.

The device and method according to the present invention provide a variable thickness mask lens with a contoured optical surface which provides both eye relief for night vision and optical sighting and optical correction to compensate for changes in lens curvature.

BRIEF DESCRIPTION OF THE DRAWINGS

These and other characteristics of the invention will be evident from the following description of preferred embodiments, given as a nondestructive example with reference to the attached drawing:

FIG. 1 shows the Phase III RESPO 21 polynomial lens design for a contoured lens.

FIG. 2 illustrates the distance of the lens from the eye pupil and the field of view for the Phase III RESPO 21 mask.

FIG. 3 is as front view of an embodiment of the present invention illustrating the mask geometry of the present invention and identifies the five areas of interest for refractive power for each eye.

DETAILED DESCRIPTION OF THE PREFERRED EMBODIMENTS

The present invention is a method and device for a variable thickness contour lens for use in a military mask. The design of a non-uniform mask lens design according to the present invention allows for optimal interfacing of internal optical correction with external sighting systems in a single lens design. Eye relief using the non-uniform lens design of the present invention allows the lens system to fall well within the 25-mm eye relief needed for night vision and optical sighting systems while still providing adequate internal eye relief for an optical correction system.

An exemplary embodiment of the present invention modifies a leading military mask lens design, illustrated in FIG. 1, to incorporate internal and external eye relief geometry. In this embodiment, the face mask lens is intended to be used 20 mm or less from the eye pupil, as illustrated in FIG. 2, with the result that the critical area of the mask lens is substantially smaller than a mask lens which is located further away from the eye. In this embodiment the angular field is held constant so that the critical area of this embodiment corresponds to the area used over a field of view of +/-37 degrees with a 0.3 inch diameter pupil, with a maximum interpupillary distance of 72 mm, as illustrated in FIG. 3. The coordinates for this leading mask lens design (contour coordinates as contained in Table 1 and profile coordinates as contained in Table 2) were used to derive a best-fit polynomial curve (using, for example, B-splines) for use with a commercially available optical analysis program. The maximum deviation of the second curve-fit from the input data is 0.012 inch.

In order to thicken the side walls of this exemplary embodiment, a $12^{th}$ order aspheric term was added to the front surface polynomial of value $-1.5e-7(inches^{11})$. This term does not contribute more than 0.001 inch to the sag of the surface until the x-coordinate on the mask exceeds 2.08 inches, which is well outside of the optical area:

$$Sag(x) = ax^2 + bx^4 + cx^6 + dx^8 + ex^{10} + fx^{12}.$$

Table 4 is this sag formulae evaluated for both surfaces and a calculation of the lens thickness as a function of x position. The mask thickness in this embodiment varies from 0.060 inch at the center of the mask lens and maintains this thickness within +/−0.001 inch to an x coordinate of 1.7 inches. Beyond this, the mask lens grows thinner to a final thickness of 0.051 inch at an x coordinate of 2.8 inches. Table 5 presents optical results for the five zones of the right eye. The left eye data is symmetric: with this data.

TABLE 5

|        | Refractive Power | Horizontal Deviation | Vertical Deviation |
|--------|------------------|----------------------|--------------------|
| Zone 1 | −0.040D          | 0.040D               | 0                  |
| Zone 2 | −0.075D          | −0.470D              | 0                  |
| Zone 3 | −0.120D          | 0.370D               | 0                  |
| Zone 4 | −0.020D          | 0.040D               | 0                  |
| Zone 5 | −0.020D          | 0.040D               | 0                  |

Alternative embodiments thicken the edge by adding a linear term to the polynomial which only contributes to the sag of the surface outside of the optical region, or by increasing the magnitude of the $12^{th}$ order aspheric on the front surface or by adding a $14^{th}$ order term. The $14^{th}$ order term does not contribute significantly to the shape of the mask lens within the optical region.

For the leading mask lens design employed in the exemplary embodiment, the derived equations for the internal and external polynomial curves of the embodiment illustrated in FIG. 1, are identical because they capture a preestablished variable-thickness lens design with inner and outer surfaces having this characteristic. Curve fitting for another variable-thickness design might result in different polynomials and will depend on the geometry of the inner and outer surfaces. The present invention is independent of the similarity of polynomials describing the inner and outer surfaces of the non-uniform mask lens.

The non-uniform mask lens can be made of any optical material. One exemplary embodiment employs cast polyurethane as the optical material. A flat variable thickness mold is fabricated from glass. The variable thickness is calculated from the optical equation Sag(x), with coefficients contained in Table 3 and thicknesses contained in Table 4. The lens thickness is calculated by subtracting the inner and outer surface dimensions to establish thickness measurements across the part. Using this flat variable thickness mold, polyurethane is cast and partially cured. This partially cured material is then transferred to a secondary forming process. This secondary process uses a mold core whose surface is machined to the inner contour of the lens. The partially cured material is formed to this inner contour by bending its non flat surface around this mold of the back surface. Then, it is fully cured into the final shape. This secondary process allows for the development of an optical quality part that does not require optical. quality machining and polishing of a core and cavity to the complex contours of the final lens.

In an alternative embodiment, the lens is fabricated using injection molding. This requires optical quality machining and polishing of a core and cavity injection mold. This contoured polishing is very complex, see S. D. Jacobs, et al, "MRF Computer Controlled Optics Manufacturing," American Ceramics Society Bulletin, December 1999, incorporated herein by reference in its entirety. Polyearbonate, thermoplastic polyurethane, and polyamide lenses can be molded using this method of determining lens geometry.

In another embodiment, the non-uniform lens geometry is approximated using a double conic geometry. The double conic geometry requires optical blending in the middle of the lens. Optical blending is minimized by forcing tangency and curvature at the mating surfaces.

Although the invention has been described by making detailed reference to certain specific embodiments, e.g., the lens illustrated in FIG. 1, such details are intended to be instructive rather than restrictive. It will be appreciated by those skilled in the art that many variations may be made in the curves and points used for defining a non-uniform geometry to fabricate any such geometry using the present invention. Only new calculations would need to be made to define the internal and external curvature required to develop the variable thickness necessary for optical quality. That is, both lens structure and mode of fabrication can be varied without departing from the spirit and scope of this invention as disclosed in the teachings herein.

We claim:

1. A single lens symmetric about a middle and having at least one surface described by a polynomial curve, said lens for use with a military mask and having incorporated therein internal and external eye relief geometry compatible with requirements of optical correction and optical sighting systems, said lens comprising:
   a front surface having a continuous edge;
   an outside profile extending downward from the forehead of a wearer having said outside profile defined by a set of lens outside profile coordinates generated by the polynomial curve;
   a contour extending from the left temple to the right temple of a wearer having said contour defined by a set of lens contour coordinates generated by the polynomial curve;
   a back surface having a continuous edge joined to said front continuous edge by a continuous edge seam to form a variable thickness therebetween for incorporating said internal and external eye relief geometry.

2. The lens of claim 1, wherein said thickness is determined by differences between a front surface best-fit polynomial generated by both said contour coordinates and said outer profile coordinates of said front surface and between a back surface polynomial curve generated from said front surface best-fit polynomial curve and the eye relief geometry requirements.

3. The lens of claim 2, wherein the eye relief geometry is approximated by a double conic geometry having- mating surfaces which meet and are optically blended in said middle of said lens.

4. The lens of claim 3, wherein:
   said optical blending is minimized by forcing tangency and curvature of said meeting of said mating surfaces.

5. The lens of claim 1, wherein said lens is an optical material.

6. The lens of claim 5, wherein said optical material is selected from the group consisting of polycarbonate, polyurethane, and polyamide.

7. A method of incorporating in a single mask lens both internal and external eye relief geometry compatible with requirements of both optical correction and optical sighting systems, comprising the steps of:
   designing a single lens which incorporates internal and external eye relief geometry compatible with requirements of optical correction and optical sighting systems;

capturing the single lens design with an input polynomial curve;

generating points with the input polynomial curve to define both the contour and outside profile of the single lens design;

generating a front surface best-fit polynomial curve from the generated contour and outside profile points;

generating a back surface polynomial curve from the generated front surface best-fit polynomial curve combined with the eye relief geometry requirements; and creating a lens that corresponds to both the generated front surface and generated back surface polynomials with an optical material.

8. The method according to claim 7, further comprising the steps of:

generating tool path coordinates for a tooling machine from the front and back surface polynomials;

creating an injection lens mold with a tooling machine from the generated tool path;

injection molding said lens in the created injection lens mold.

9. The method according to claim 7, further comprising the steps of:

expressing the eye relief geometry requirements as differences between the generated front and back surface polynomials;

creating a flat variable thickness mold corresponding to the expressed differences;

generating tool path coordinates for a tooling machine from the back surface polynomial;

creating a lens mold for the back surface with a tooling machine from the generated tool path;

casting a lens with the created flat variable thickness mold;

partially curing the cast lens; and forming the partially cured cast lens around the created lens mold for the back surface.

10. The method according to claim 7, wherein said optical material is selected from the group consisting of polycarbonate, thermoplastic polyurethane, and polyamide.

11. A single variable-thickness lens for use with a military mask and having incorporated therein internal and external eye relief geometry compatible with requirements of optical correction and optical sighting systems produced by the method of claim 7.

* * * * *